United States Patent [19]

Gaishin et al.

[11] 4,177,426
[45] Dec. 4, 1979

[54] RADIO CONTROL SYSTEM WITH PLUGGABLE MODULES FOR CHANGING SYSTEM OPERATING FREQUENCY

[75] Inventors: Rudolph M. Gaishin, St. Joseph; Garry C. Covert, Baroda, both of Mich.

[73] Assignee: Heath Company, Benton Harbor, Mich.

[21] Appl. No.: 627,425

[22] Filed: Oct. 30, 1975

[51] Int. Cl.² .............................................. H04B 7/00
[52] U.S. Cl. ..................................... 325/37; 325/355; 343/225; 361/392
[58] Field of Search ............. 325/15, 16, 37, 390–392, 325/64, 59, 440, 355, 356, 51, 156, 153; 343/225, 228; 340/171 R; 179/1 PC; 361/392, 393

[56] References Cited

U.S. PATENT DOCUMENTS

| | | | |
|---|---|---|---|
| 2,560,320 | 7/1951 | Winkler | 325/16 |
| 2,580,453 | 1/1952 | Murray et al. | 325/37 |
| 2,798,944 | 7/1957 | Lund | 325/392 |
| 3,324,396 | 6/1967 | Schneider | 325/153 |
| 3,333,200 | 7/1967 | Wolfram | 325/440 |
| 3,667,045 | 5/1972 | Combs | 325/15 |
| 3,747,108 | 7/1973 | Ringer | 325/37 |
| 3,754,187 | 8/1973 | Deming | 325/37 |
| 3,835,454 | 9/1974 | Palmieri et al. | 343/225 |
| 3,858,116 | 12/1974 | Friedl et al. | 325/37 |
| 3,886,453 | 5/1975 | Quintilliani et al. | 235/61.6 H |

*Primary Examiner*—Marc E. Bookbinder
*Attorney, Agent, or Firm*—William R. Sherman; Joseph J. Kaliko; William B. Kempler

[57] ABSTRACT

A radio control system for controlling model airplanes, model boats and the like. The system includes a multi-channel transmitter and a multi-channel receiver each operative on the same assigned radio control frequency. The system operating frequency is changeable by exchanging both a small pluggable transmitter module and a small pluggable receiver module with a different transmitter and receiver module respectively, the latter modules being operative on an assigned radio control frequency different from that of the former modules. The system provides quick and easy change of the operating frequency thereby permitting simultaneous radio control of many models via many such systems operating on non-interfering radio control frequencies.

19 Claims, 14 Drawing Figures

RADIO CONTROL SYSTEM WITH PLUGGABLE MODULES FOR CHANGING SYSTEM OPERATING FREQUENCY

Since radio control enthusiasts must purchase equipment operative on one of a plurality of assigned radio control frequencies, there is a finite probability that two such hobbiests may wish to use equipment operative on the same frequency at the same time in the same vicinity. When this happens, radio interference between the two systems may occur, causing loss of control of a model by one or both hobbiests. The problem of radio interference between hobbiests becomes even more probable at radio control competitions when large numbers of hobbiests often compete. To overcome this problem, the competition organizers must set up an elaborate record keeping system to identify the frequencies in use at any one moment of time. Even if record keeping avoids radio interference, delay in the competition frequently occurs as some hobbiests must wait their turn to use a popular frequency.

The problem of interference on radio control frequencies has been somewhat alleviated over the years by the assignment of more frequencies for this purpose. However, increased popularity of the hobby has minimized the beneficial effect of assigning more frequencies for radio control use.

Manufacturers have also attempted to alleviate the problem of interference by designing radio control transmitters and receivers that operate on more than one assigned radio control frequency. The best designs available to date incorporate a switch for changing oscillator crystals of the transmitter or the receiver to change the operating frequency. At best, switching between two adjacent radio control frequencies in the same band is achieved but switching between non-adjacent frequencies or between frequencies in different bands such as the 27 MHz band, the 53 MHz band and the 72 MHz band has not been achieved because radio transmitters and receivers cannot be made broad banded enough to operate at such different frequencies. Consequently available frequency changeable radio control equipment has not eliminated the problem of interference between radio control systems, especially at competitions.

OBJECTS AND SUMMARY OF THE INVENTION

In view of the foregoing difficulties, it is the principle objective of the invention to provide a radio control system whose operating frequency can be quickly and easily changed by the operator from one to any other assigned radio control frequency.

It is another objective of the invention to provide a radio control system whose operating frequency can be changed quickly and easily from one to any other assigned radio control frequency so that system operation will not interfere with the operation of other radio control systems already operating in the vicinity.

It is still another objective of the invention to provide a radio control system permitting quick change of operating frequency from one assigned frequency to any other assigned frequency at nominal expense.

The invention comprises a radio control system having pluggable modules which include circuit components to determine the operating frequency. The system operating frequency is changed by exchanging both the transmitter and the receiver modules for other modules, both operative on another assigned frequency.

More specifically, the radio control system of the invention includes a hand-held radio transmitter for generating a modulated radio signal on any one of the assigned radio control frequencies. The transmitter is divided into two principal sections, a modulator section and a transmitter section. The modulator section is mounted in a hand-held chassis and includes circuitry to generate electrical modulation signals representative of desired control information for operating a servo or the like on board a model. The transmitter section is packaged in a pluggable module which plugs into a socket in the transmitter chassis. The transmitter module includes components such as transistors for the oscillator, a doubler where needed, a final amplifier stage as well as a crystal, tuned circuits, resistors and the like. The pluggable module receives a modulation signal from the modulator section and produces a modulated radio frequency signal which is radiated by an antenna mounted on the transmitter chassis. The system receiver aboard the model has a pluggable module which is tuned to the system transmitter frequency and produces a signal at a fixed intermediate frequency regardless of the frequency to which the receiver module is tuned. The receiver also includes a demodulator connected to the receiver module and responsive to signals at the fixed intermediate frequency to extract the modulation signal. The modulation signal is used to control servos aboard the model.

The foregoing and other objects, features and advantages of the invention will be described hereinafter in greater detail in connection with one embodiment of the invention as shown in the drawings which form a part of the original disclosure wherein.

DETAILED DESCRIPTION

The invention comprises a radio control system for remote control of model aircraft, boats, cars and the like and includes a hand-held transmitter and a receiver aboard the model. Control information is generated at the transmitter and sent to the receiver where the control information is utilized to control model movement by activating servo mechanisms aboard the model.

As noted earlier, prior radio control systems have generally operated on one assigned frequency although more recent systems have included switches to change the operating frequency between one of two adjacent assigned frequencies in the same band. The present invention, however, is much more flexible because the hobbiest can change the system operating frequency from any one to any other assigned radio control frequency by merely replacing a transmitter module and a receiver module.

For convenience, the following detailed description of one embodiment of the invention is divided into a discussion first of the transmitter followed by a separate discussion of the receiver. Further details of the invention are found in "Model GDA-1205-D 8-Channel Digital Proportional Radio Control Transmitter Heathkit Assembly Manual", "Model GDA-1205-2 8-Channel-Modular R/C Receiver Heathkit Assembly Manual" and "Instructions for the Heathkit RF Module for the Receiver Model GDA-1205-2", the contents of which are herein incorporated by reference.

Hand-Held Radio Transmitter

Figure 1:
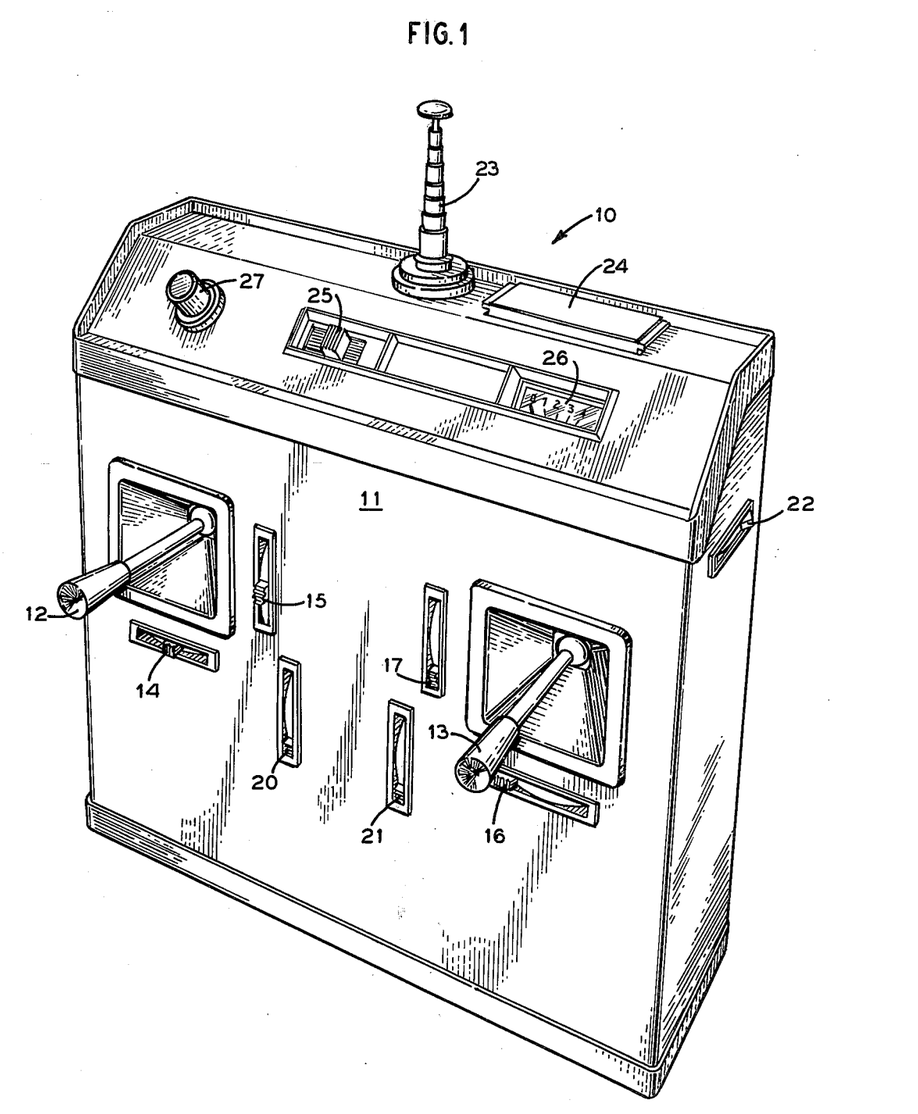
FIG. 1 is a perspective view of a hand-held radio control transmitter of the type contemplated by the invention.

FIG. 1 shows a multi-channel radio transmitter 10 which has a chassis 11 of a size, weight and shape suitable for being hand carried. The transmitter 10 is of the dual control type and has two stick controls 12 and 13, of a type well known in the radio control art, each for adjusting two channels either individually or simultaneously.

Trim tabs 14 and 15 are associated with the stick control 12 and trim tabs 16 and 17 are associated with the stick control 13. Each trim tab 14, 15 16 or 17 is operative to finely adjust the signal associated with a particular channel. Other channel controls 20, 21 and 22 are mounted on the chassis 11. Another channel control (not shown) is provided with the control being located on the side of the chassis 11 opposite the side on which control 22 is located. As such, the transmitter 10 has controls for 8 channels.

All of the above-mentioned controls 12, 13, 20, 21 and 22 operate in a manner similar to the operation of the controls of the Heathkit Radio Control Transmitter Model GDA-405-D which is an 8-channel digital proportional radio control transmitter. The GDA-405-D is described in greater detail in the Heathkit Assembly Manual therefor and the disclosure therein is, in its entirety, incorporated herein by reference.

The transmitter 10 has a telescoping antenna 23, which is shown in FIG. 1 in its telescopically collapsed position.

In operation, the antenna 23 is telescopically extended to form a whip-like electrically conductive body for radiating a radio signal. The radiated radio signal is modulated by a modulator section located inside the chassis 11 with the modulation being controlled by the channel controls such as the stick controls 12 and 13 and the other channel controls 20, 21 and 22.

A radio frequency signal is generated in a pluggable module 24 which is inserted through the exterior top wall of the chassis 11 and connects via a connector (not seen in FIG. 1) to the antenna 23 as well as to the modulation circuitry. Should the hobbiest desire to change the transmitter frequency, he need only remove the pluggable module 24 and replace it with another module 24 operative on another assigned frequency.

The transmitter 10 has an on-off switch 25 for turning the transmitter power on and off. In addition, an RF signal strength meter 26 is provided to show the signal strength of the radio signal generated in the module 24. The relative signal strength indication is also used to indicate the battery charge.

A trainer switch 27 is also provided. The operation of the trainer switch 27, however, is not relevant to the invention and will not be further described. Further detail of the trainer switch and its operation is found in the Heathkit Assembly Manuals incorporated herein by reference.

Modulator and Power Circuitry

Figure 2:
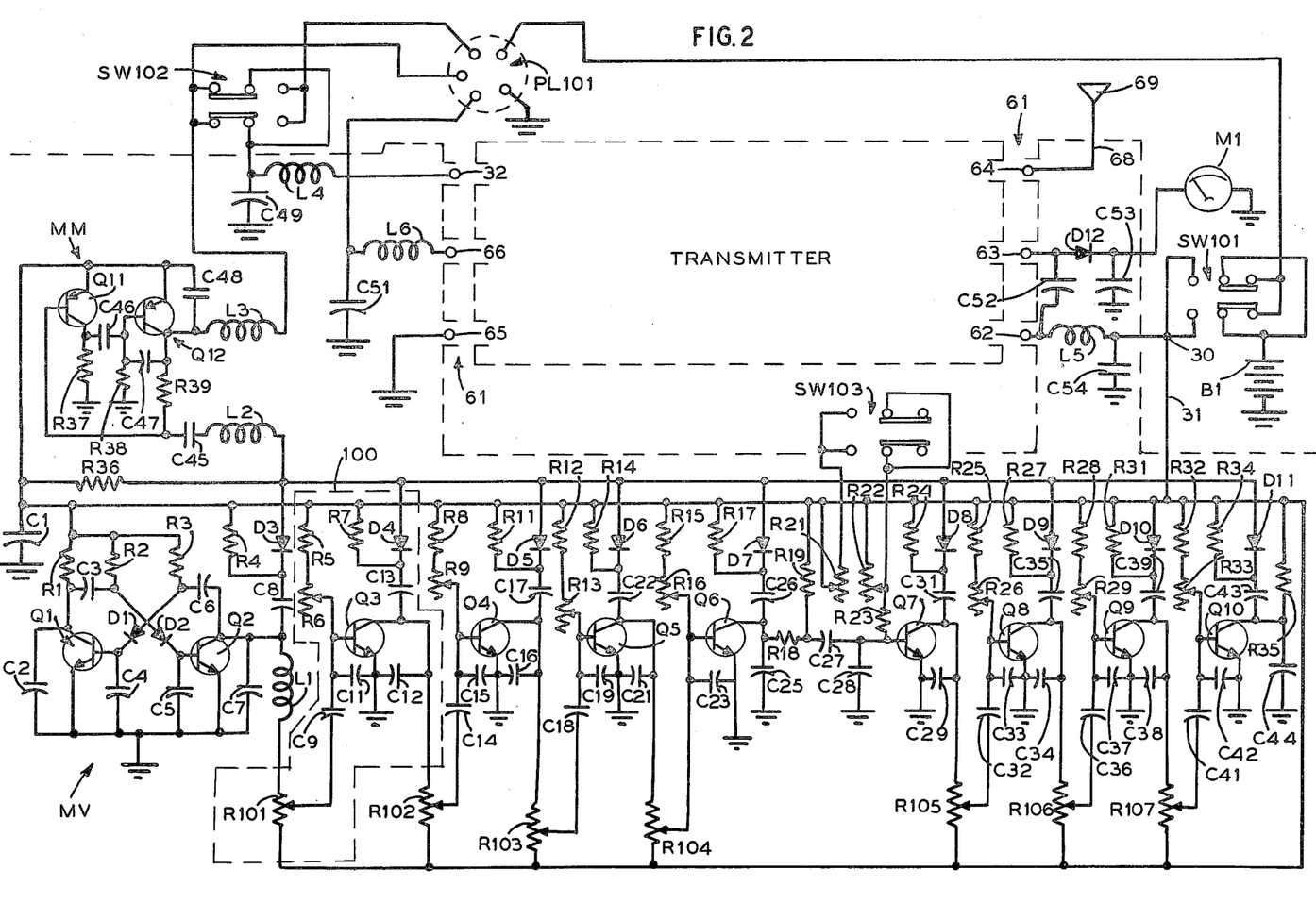
FIG. 2 is a detailed schematic diagram of the modulator and power supply for the transmitter.

The circuit diagram of FIG. 2 shows the modulator and power circuitry for an 8-channel transmitter which is common to all transmitters characterized by the invention. That is, this circuitry can be used with any pluggable transmitter module available to the system user. As will become evident, the circuit of FIG. 2 can be modified to provide modulation for any number of channels.

Power for the modulation circuitry and the transmitter module is provided by a battery B1 having its negative terminal connected to chassis ground and the positive terminal connected to the on/off switch SW101 which is shown in its off position. When the swich SW101 is in its on position, the positive terminal of the battery B1 is connected to the connection point 30. The modulator of the invention receives power from point 30 over wire 31 while the transmitter module receives its power connection via pin 62.

A free running multivibrator MV comprised of transistors Q1 and Q2 and the connected resistors, capacitors and diodes is provided to produce a square wave signal at the collector of Q2. The component values for R2,R3,C3, and C6 are selected for the illustrated embodiment of the invention so that the square wave at the collector of Q2 has a period of 25,000 $\mu$sec. The other components including R1,C2,C4,C5,C7,D1 and D2 are selected to properly operate the multivibrator MV at the desired frequency. Different component values can be selected to produce other square wave signal periods which will be useful for similar or other applications of the invention.

The square wave signal at the collector of Q2 has two functions. The first function is to provide framing signals at precise time intervals to start each data frame which, for the embodiment shown, contains data segments for 8 channels and a synchronizing segment. The second function of the square wave signal is to trigger the sequential operation of a plurality of monostable timer circuits which produce timing signals representative of the position of the transmitter control associated with each channel.

When the free running multivibrator MV is operating, transistor Q2 turns on and off once during each multivibrator period. When it turns on, the voltage at the collector of Q2 falls. This falling voltage is coupled via a capacitor C8 and a diode D3 to a monostable multivibrator MM which includes the transistors Q11 and Q12. The coupled falling voltage at the base of Q11 causes it to conduct thereby producing a positive pulse at its collector which is coupled through C46 to the base of Q12 turning it off thereby causing the voltage at its collector to go low. The voltage at the collector of Q12 is coupled via L3, SW102 and L4 to the connector pin 32. As will be evident later, the voltage at pin 32 turns the transmitter module on or off depending on whether the voltage is high or low respectively.

The transistor Q12 remains off so long as the charge on capacitor C46 reverse biases its base-emitter junction. The capacitor C46 is discharged through resistor R38. For the desired application of the invention, R37 and C46 are chosen so that the transistor Q12 remains off for a 350 microsecond period following the coupling of a negative pulse through C45 to the base of transistor Q11.

Since the voltage at pin 32 is low when Q12 is off and this low voltage turns off the transmitter (the mechanism for turning the transmitter off being described later), the transmitter output goes to zero for a 350 microsecond period identified in FIG. 14 as the frame starting pulse. Thereafter, the transmitter turns on because the voltage at the collector of Q12 goes high.

Figure 14:
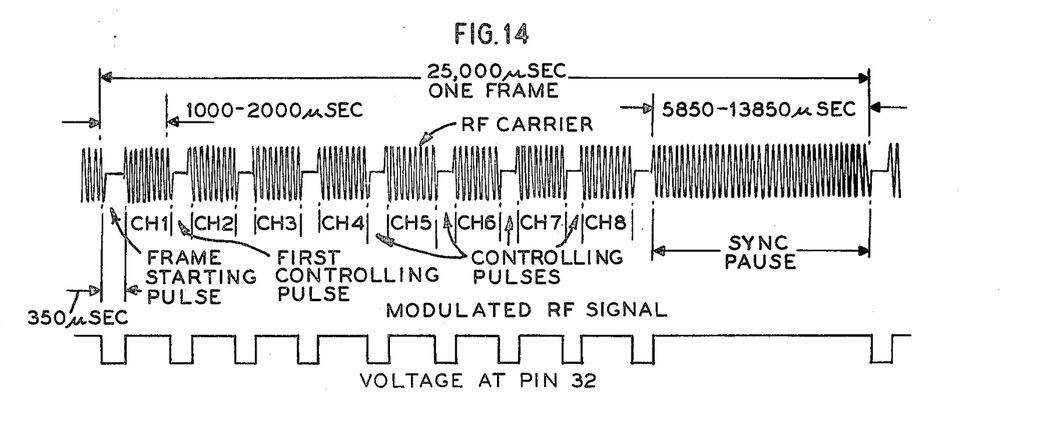
FIG. 14 shows a typical output waveform for the radio control transmitter of FIGS. 2-5.

The next transmitter off period in the sequence shown in FIG. 14 is controlled by the Channel 1 control circuitry which comprises a monostable timer shown within the dotted line 100 and includes a control resistor R101 and a range control resistor R6. The monostable timer is triggered by a negative pulse at the collector of Q2 which is coupled via L1, R101 and C9 to the base of a normally conducting transistor Q3, turning Q3 off. The amount that the base of Q3 is driven negative depends on the position of the wiper of R101 which typically is controlled by the position of a stick control such as control 12 in FIG. 1. Once transistor Q3 is turned off, the voltage at its base beings to rise due to a charging current supplied to C9 through R5 and R6. When the voltage at the base of Q3 rises to about +0.6 volts, Q3 turns on and the voltage at the collector of Q3 falls causing a negative going timing pulse to be coupled via C13, D4, L2 and C45 to the base of transistor Q11 in the monostable multivibrator MM which responds thereto in the same manner as it responded to the negative pulse from the free running multivibrator MV ie. transistor Q12 is turned off for a 350 μsec period.

The Channel 1 control circuits elements are selected for the desired application of the invention so that Q3 remains off for an adjustable period of time ranging from 1000 to 2000 microseconds following the leading edge of the negative pulse from the free running multivibrator MV. Consequently, the transmitter is turned on for a period of time varying between 650 and 1650 microseconds following the turn on of transistor Q12 with the transmitter on time being determined by the position of the Channel 1 controls R6 and R101. The transmitter on time for Channel 1 is shown diagramatically in FIG. 14 for the period labeled CH1.

The negative going timing pulse generated at the collector of Q3 is coupled by R102 and C14 to a second monostable timer circuit which has a circuit like the first timer circuit inside the dotted line 100 and includes Q4. The second monostable timer circuit responds to the negative pulse generated when Q3 turns on in the same manner that the first monostable timer circuit responds to the negative pulse from the collector of Q2. As such, the first monostable timer circuit provides timing for the first channel and triggers the second monostable timer circuit.

The remaining six monostable timer circuits include respectively transistors Q5, Q6, Q7, Q8, Q9 and Q10, each being triggered by a negative pulse from the preceding monostable timer. Each of these six monostable timers developes a negative pulse to trigger the monostable multivibrator MM at adjustable time lengths after they are triggered. Consequently, each negative pulse from the free running multivibrator MV causes the sequential generation of eight additional negative pulses with the timer period between these pulses being selectable according to the position of the variable resistors in each monostable timer circuit. Each of these eight negative pulses cause the monostable multivibrator MV to lower the voltage at pin 32 for a period of 350 microseconds thus turning off the transmitter for a corresponding period of time. FIG. 14 illustrates this operation.

In connection with the circuit of FIG. 2, the component values thereshown and also those listed below in Table 1 have been found beneficial for the desired application of the invention. Other circuit components can be selected to adapt the circuit to similar and other applications.

TABLE 1

| Resistors | |
|---|---|
| R1, R35 | 4700 |
| R2 | 180K |
| R3, R5, R8, R12, R15 | 82K |
| R4, R7, R11, R14, R17, R23, R24, R27, R31, R34 | 47K |
| R6, R9, R13, R16, R26, R29, R33 | 50K adjustable |
| R18, R19, R37 | 2200 |
| R21, R22 | 100K adjustable |
| R25, R28, R32 | 39K |
| R101, R102, R103, R104, R105, R106, R107 | 5000 adjustable |
| R38 | 18K |
| R39 | 10K |
| Capacitors | |
| C1 | 50 uF |
| C2, C3, C7, C48 | .1 uF |
| C4, C5, C11, C12, C15, C16, C19, C21, C24, C25, C28, C29, C33, C34, C37, C38, C42, C44 | .001 uF |
| C6, C46 | .22 uF |
| C8, C13, C17, C22, C26, C35, C39, C43 | .0033 uF |
| C9, C14, C18, C23, C27, C32, C36, C41 | .047 uF |
| C45, C47, C51, C53, C54 | .005 uF |
| C49 | .01 uF |
| C52 | 3.3 pF |
| Inductors | |
| L1 | 1 MH |
| L2, L3, L4, L5, L6 | 4.65 uH |
| B1 | 9.6 volts |
| Transistors | |
| Q1, Q2, Q3, Q4, Q5, Q6, Q7, Q8, Q9, Q10 | MPS-A20 |
| Q11, Q12 | X29A829 |
| Diodes | |
| D1, D2, D3, D4, D5, D6, D7, D8, D9, D10, D11, D12 | IN4149 |

Figure 9:
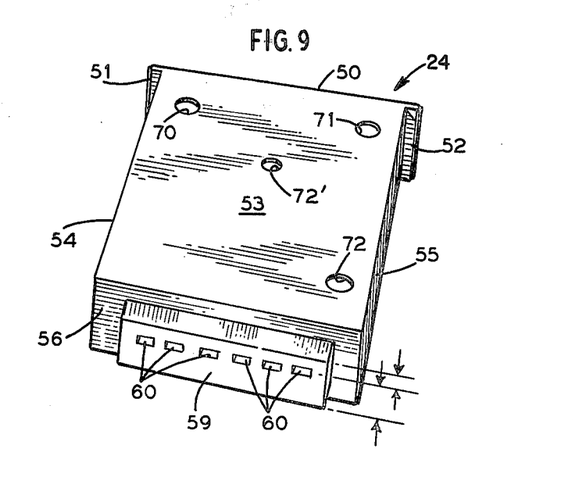
FIG. 9 is a perspective view of an assembled transmitter module, case and connector.

In accordance with the invention, the transmitter module 24 has a metal case like that shown in FIG. 9 whose size is approximately that of a cigarette package. The case includes a top wall 50 with laterally extending portions 51 and 52 which form stops to prevent the module from being forced into the module receiving pocket of the chassis 11. The transmitter module 24 also has side walls 53, 54 and 55, a further side wall (not shown) disposed opposite wall 53 and a bottom wall 56 through which a female connector block 59 extends. The metal case formed by the walls of the transmitter module is in close proximity to the electrical components, particularly the inductors, of the transmitter module which has a large effect on the transmitter circuit operation. As such, the module must be tuned with a metal case around it so as to compensate for this proximity effect. This transmitter module tuning is accomplished by providing holes 70, 71, 72 and 72' through the metal case to permit tuning of the variable inductors inside the case.

The connector block 59 has pin receiving sockets 60 for receiving connector pins located at the bottom of the module receiving socket in the chassis 11 of the hand-held transmitter (not shown). The sockets 60 are offset from the center line of the module and mate with connector pins at the bottom of the module receiving pocket of the chassis 11 only when the module 24 is inserted correctly into the pocket. This arrangement prevents circuit damage due to incorrect plugging of the module 23.

Referring again to FIG. 2, the connector pins at the base of the module receiving pocket are shown schematically at 61 and include a power connector pin 62, a calibrating resistor connecting pin 63, an antenna connecting pin 64, a ground connecting pin 65, a trainer connecting pin 66 and a gating connecting pin 32. These six pins provide all of the electrical connections necessary between a transmitter module and the modulation and power supply circuitry of FIG. 2. It should be noted, however, that if the training function is not desired, pin 66 can be eliminated without impairing circuit operation. Furthermore, if alternative means are provided for measuring the output power or if output power is not monitored, pin 63 can also be eliminated.

The power connection pin 62 connects through an inductor L5 which provides rf isolation between the module and the power supply.

The antenna connection pin 64 is connected via a wire 68 to the telescoping antenna shown schematically at 69. By providing the antenna connection to the transmitter module via pin 64, the size of each transmitter module is made relatively small because each module is designed without an antenna which is relatively large in size. Pin 64 and the associated antenna connection wire 68 can be eliminated, if so desired, by providing an antenna for each transmitter module but this approach is less desireable than the approach shown because of increased size and cost.

Figure 3:
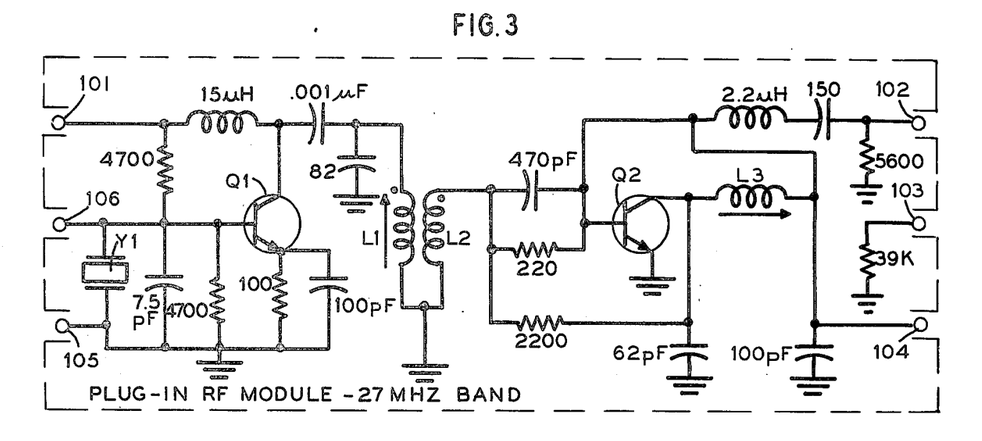
FIGS. 3, 4 and 5 are detailed circuit diagrams of pluggable transmitter modules of the invention operable respectively in the 27 MHz, 53 MHz and 72 MHz radio control bands.
Figure 4:
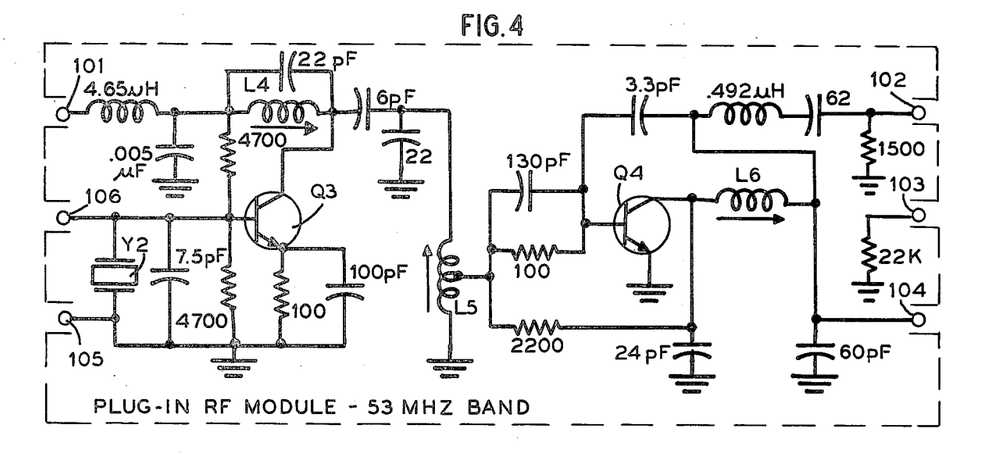
Figure 5:
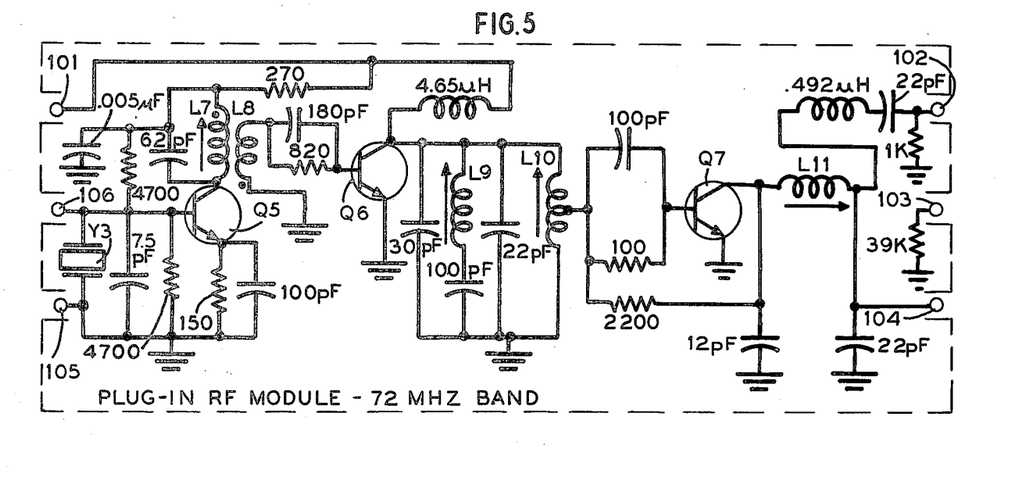

Referring now to FIGS. 3, 4 and 5, a detailed circuit diagram is provided for the transmitter modules for use respectively in the 27, 53 and 72 MHz bands. The circuit elements found to be advantageous for each of these transmitter modules are either shown in FIGS. 3–5 or in Table 2. Other circuit elements can be substituted therefor to adapt the circuit to similar or other applications.

TABLE 2

| Y1 | 26.995, | 27.045, | 27.095, | 27.145 | or 27.195 MHz |
|---|---|---|---|---|---|
| Y2 | 53.100, | 53.200, | 53.300 | 53.400 | or 53.500 MHz |
| Y3 | 72.080, 72.160, 72.240, 72.320, 72.400, 72.960, or 75.640 MHz | | | | |
| L1 | 9½ turns #26 wire | | Q1 2N2369 | | M1 |
| L2 | 2½ turns #26 wire | | Q2 2N3641 | | |
| L3 | 11¾ turns #26 wire | | Q3 2N2369 | | |
| L4 | 6½ turns #26 wire | | Q4 2N3866 | | |
| L5 | 6½ turns #26 wire | | Q5 2N2369 | | |
| | 1¾ turns start to tap | | | | |
| L6 | 5¼ turns #26 wire | | Q6 2N2369 | | |
| L7 | 6¾ turns #26 wire | | Q7 2N3866 | | |
| L8 | 1¾ turns #26 wire | | L1-L11 coil form #6-32 slotted "Carbonhyl J" Coilcraft, Cary, Ill. | | |
| L9 | 4½ turns #26 wire | | | | |
| L10 | 5½ turns #26 wire | | | | |
| | 1¾ turns start to tap | | | | |
| L11 | 7½ turns #26 wire | | | | |

In the illustrated embodiment for a transmitter module according to the invention, the magnetic axis for every tunable inductor is disposed in parallel relation to each other. In addition, the transmitter size is minimized by arranging its stages along the perimeter of the circuit board. By doing so, mutual coupling is increased, between transmitter stages, however, stability is still maintained by carefully selecting the phasing of the inductors with respect to each other. By experiment, it has been found that winding the inductors according to the dot convention shown in FIGS. 3–5 provides a stable transmitter.

Figure 6:
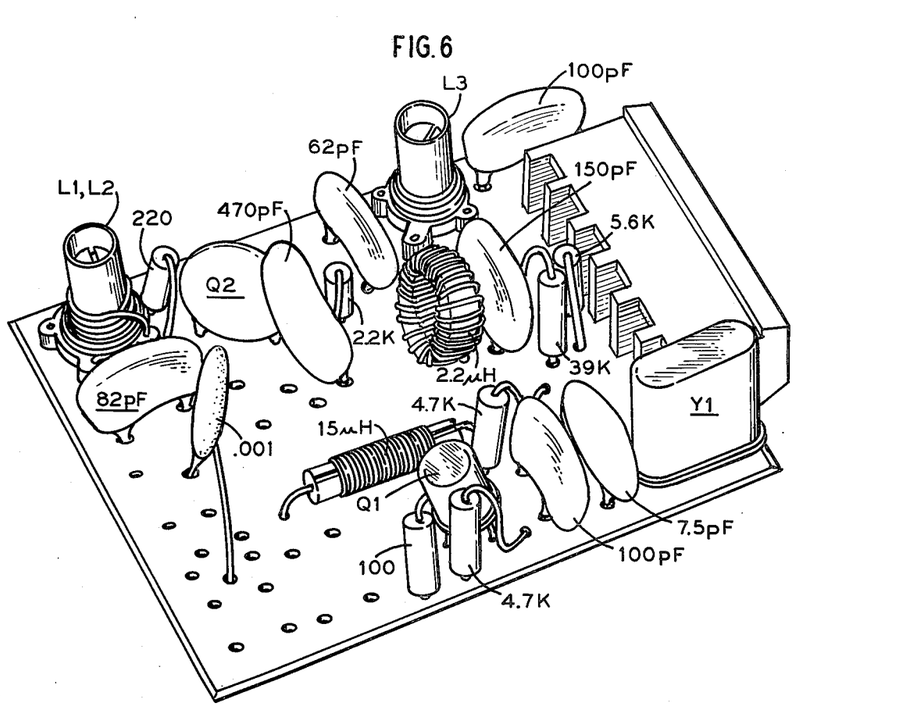
FIGS. 6, 7 and 8 show the component layout respectively for the pluggable transmitter circuits of FIGS. 3-5.
Figure 7:
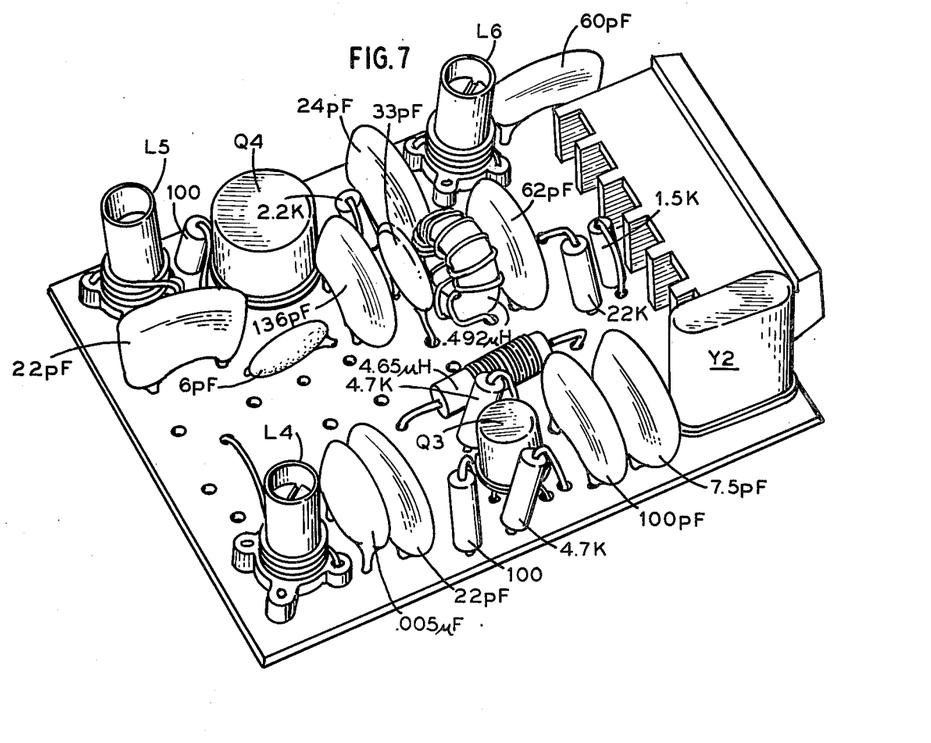
Figure 8:
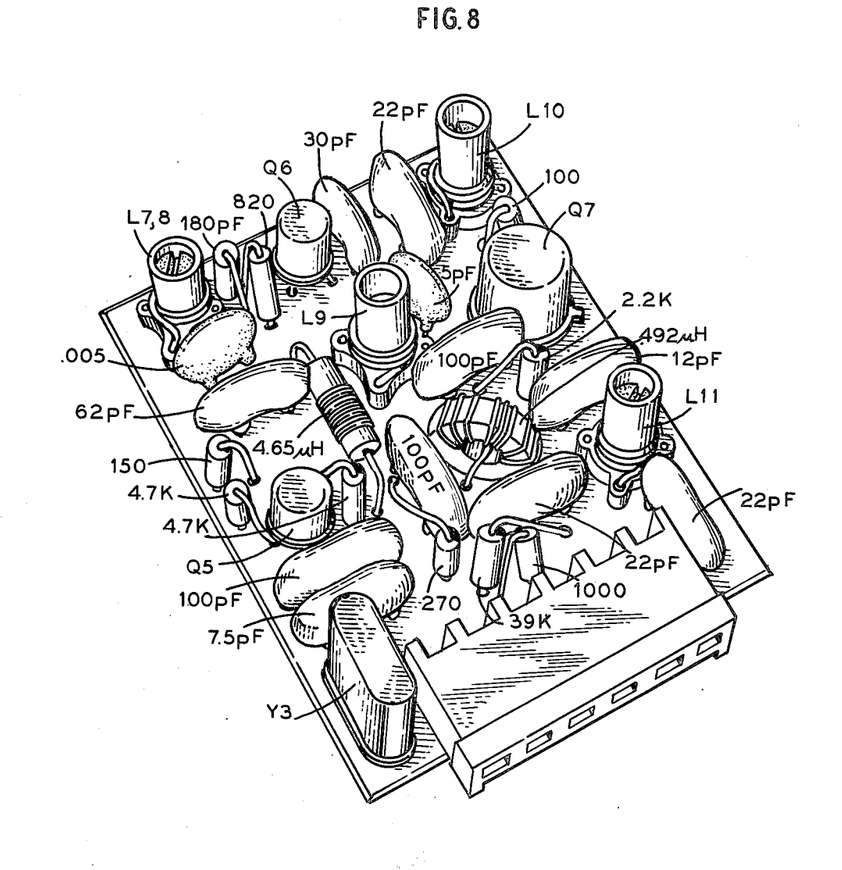

The actual physical layout of the components on a printed circuit board for each of the circuits of FIGS. 3–5 is shown respectively in FIGS. 6–8. It will be noted from the physical layout of each transmitter module in the three available bands that most of the tunable inductors are located at the corners of the module so they will be as far apart as possible to minimize coupling therebetween. The holes 70, 71, 72 and 72' through the module case (FIG. 9) are located so that the tunable inductors are accessable therethrough.

Since the Federal Communication Commission regulations do not permit radio control operators to adjust their own transmitter, the transmitter modules supplied to customers in accordance with the present invention preferably do not have the holes 70, 71, 72 and 72' in the metal case. The transmitter, however, is first tuned at the factory using a metal case of the type shown in FIG. 9 and then replaced with another case not having holes. Alternatively, the metal case of a module shipped to a customer can include the holes 70, 71, 72 and 72', however, the holes are covered by a label or the like to prevent tampering with the circuit.

FIG. 3 shows a 27 MHz band transmitter module with a known circuit configration having component values selected to comply with FCC regulations for radio control transmitters. This transmitter module is typical of the invention and has a crystal controlled oscillator including transistor Q1 which oscillates at a frequency determined by the crystal Y1. Power is connected to the oscillator via a socket 101 which mates with pin 32 in the modulation circuit of FIG. 2. Whenever the voltage at 101 is high, power is applied to the oscillator and it produces a radio frequency signal through L1 at a frequency controlled by the crystal Y1. This occurs when Q12 (FIG. 2) is conducting. When Q12 is turned off in response to a pulse from a timer circuit or the free running multivibrator MV, power is removed from the oscillator in FIG. 3 and it turns off.

The transmitter module of FIG. 3 has a conventional rf amplifier including Q2 which amplifies the signal across L2 and applies the amplified signal via socket 102 which mates with pin 64 to the antenna 69. The rf amplifier produces the amplified signal at socket 102 whenever the crystal controlled oscillator is on. As such, the radio frequency signal at the antenna is gated on and off by the signal at socket 101 so that a time plot of the modulated rf signal looks like that shown in FIG. 14.

The 27 MHz transmitter module of FIG. 3 has sockets 103, 105 and 106 which respectively mate with pins 63 62, 65 and 66 of the modulation circuit in FIG. 2. The radio frequency signal from Q2 is coupled via socket 104 (FIG. 3), pin 62 (FIG. 2) C52 and D12 to the meter M1. The rf signal is rectified by D12 so that the meter M1 will deflect. The reading of M1 is calibrated by the 39K resistor connected to socket 103 (FIG. 3) which mates with plug 63 (FIG. 2) which also connects to D12. Since a radio control operator cannot adjust the transmitter output according to FCC regulations, the meter M1 reading can be used to indicate the state of the charge on battery B1. When the meter M1 reading is high, the charge on B1 is high. Conversely, when the meter M1 reading is low, the battery B1 needs recharging.

Socket 104 also provides power for the rf amplifier while 105 and 106 provide respectively ground and trainer connections to the transmitter module.

The 53 and 72 MHz transmitter modules of FIGS. 4 and 5 are also well known transmitter circuit configurations. These circuits respond to the modulation signal at socket 101 in the same way as the circuit of FIG. 3 i.e. the module oscillator turns on only when the voltage at pin 32 is high.

Receiver Circuit

Figure 10:
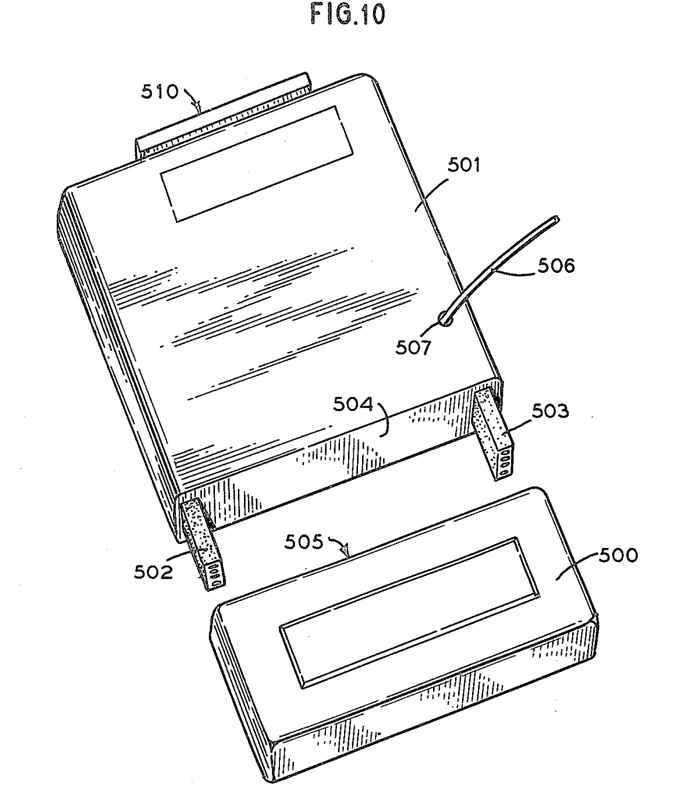
FIG. 10 is a perspective view of a radio control receiver with the pluggable receiver module un-plugged.

The radio control system of the present invention includes a receiver with a pluggable rf module for changing the frequency to which the receiver is tuned. The receiver is packaged in a small light-weight chassis suitable to being mounted in a model car, boat, airplane or the like. FIG. 10 shows a receiver of the invention having a pluggable rf module 500 which, as shown, is unplugged from the receiver module 501. The pluggable rf module 500 has female sockets (not shown) which engage the male connectors 502 and 503 and, when the rf module 500 is pressed toward the receiver module 501, the surface 504 abuts the rear surface of the rf module 500, one edge of which is indicated at 505. The female sockets and the male connectors 502 and 503 are constructed to connect together in only one way to prevent the rf module 500 from being improperly connected to the receiver module 501.

The receiver includes an antenna connection wire 506 which passes through a hole 507 in an exterior wall of the receiver module 501. This wire 506 provides an electrical connection between an antenna aboard the model and the receiver.

The receiver module 501 also has a connector block 510 which receives plugs (not shown) to provide electrical connection with a plurality of servomechanisms. Each servomechanism controls, for example, an aileron, rudder, motor speed or the like. A suitable servomechanism is described in the Heathkit Assembly Manual for Model GDA-1205-5 and the contents of that manual, in its entirety, is herein incorporated by reference. The servomechanisms described in that manual adjust their shaft position according to the length of time a control pulse is applied thereto.

In general, the receiver of the invention is an AM superhetrodyne receiver having a tunable, double-tuned front end with an RF amplifier physically located in the pluggable rf module 500. Also included in each rf module 500 is a crystal-controlled autodyne converter circuit used to convert the frequency of an incoming radio frequency signal to a intermediate radio frequency signal at a known frequency regardless of the frequency of the incoming radio signal to which the receiver is tuned.

The receiver module 501 houses 3 ceramic filters and 2 IF amplifier stages. Following the last IF amplifier stage is a power detector stage which provides further gain and also provides an automatic gain control signal for both the RF amplifier in the pluggable rf module 500 and the IF amplifiers. The detected signal passes through a noise limiter and two pluse amplifier stages to an integrated circuit (IC) decoder. The IC decoder is operative to separate the modulation signals generated at the radio transmitter into separate channel control signals for use by servos abroad the model.

Figures 11, 12:
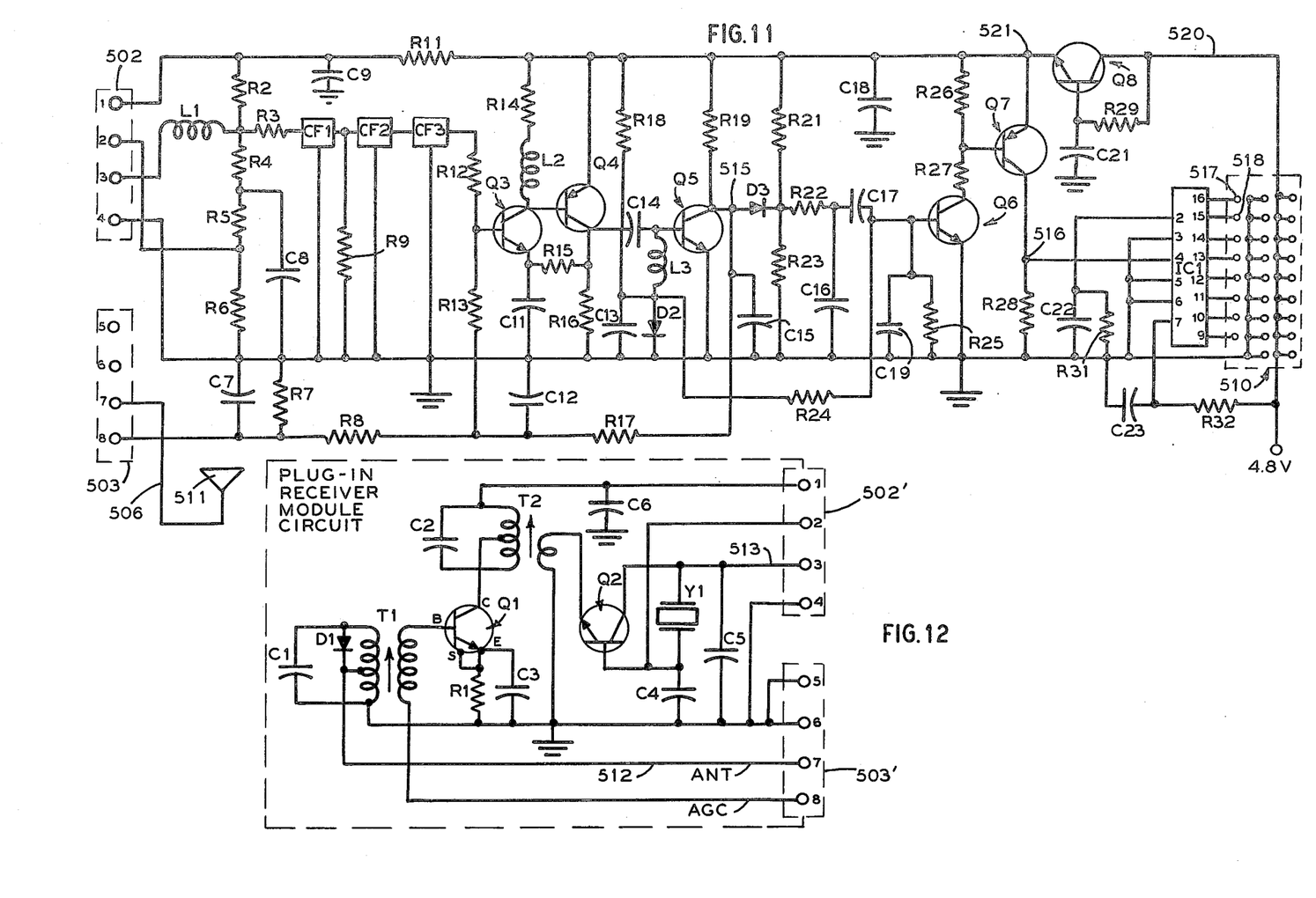
FIG. 11 is a circuit diagram for the receiver demodulator.
FIG. 12 is a schematic circuit diagram of a pluggable receiver module for radio control receivers of the invention.

The circuit diagram for a typical pluggable rf module is shown in FIG. 12. For that circuit, the components which provide excellent results are shown in Table 3. Those of skill in the art will recognize that other component values may be selected and the resulting receiver will function well for the same or other applications of the invention.

TABLE 3

| Receiver Module Components | | | |
|---|---|---|---|
| Y1 | 26.542, 26.592, | 26.642, 26.692 | or 26.742 MHz |
| R1 | 1500 | | |
| C1, C2 | 47F | | |
| C5 | 75pF | | |
| | Primary | Start to Tap | Secondary |
| T1 | 12¼ turns #26 wire | 6⅜ turns | 2¼ turns #26 wire |
| T2 | 13¼ turns #26 wire | 5¼ turns | 1¼ turns #26 wire |
| | 53 MHz | | |
| Y1 | 26.3235, 26.3735, | 26.4235, 26.4735 | or 26.5235 MHz |
| R1 | 2700 | | |
| C1, C2 | 27pF | | |
| C5 | 47pF | | |
| | Primary | Start to Tap | Secondary |
| T1 | 7¼ turns #26 wire | 4⅞ turns | 2¼ turns #26 wire |
| T2 | 7¼ turns #26 wire | 5¼ turns | ¾ turns #26 wire |
| 72 MHz | | | |
| Y1 | 36.2665, 36.3065, 36.3465, 36.4265, 36.7065 or 37.5935 MHz | | |
| R1 | 1000 | | |
| C1, C2 | 27pF | | |
| C5 | 47 pF | | |
| | Primary | Start to Tap | Secondary |
| T1 | 5¼ turns #24 wire | 4⅞ turns | 1¼ turns #24 wire |
| T2 | 5¼ turns #24 wire | 3⅛ turns | ¾ turns #24 wire |
| Common to All Receiver Modules | | | |
| C3, C6, | .047 uF | T1, T2, Coil form #6-32 slotted "Chrbohyl J" | |
| C4 | 75 pF | Coilcraft, Cary, Ill. | |
| Q1 | SE5055 | | |
| Q2 | 1602349 | | |
| D1 | IN4149 | | |

Referring now to FIGS. 11 and 12, a radio signal from a transmitter of the type described earlier is picked up by an antenna 511 (FIG. 11) which is located aboard the model. The received signal is transmitted via a wire 506 to socket 7 of the connector 503. When the rf module 500 pluggably engages the receiver module 501, socket 7 of connector 503 mates with pin 7 of connector 503' (FIG. 12) thereby connecting the received signal to the rf module circuit. The received signal passes through wire 512 to a resonant circuit comprising the primary of transformer T1 and C1 which is tuned to the desired receiver frequency. A diode D1 connected across the parallel resonant circuit of T1 and C1 is used to limit strong signals and prevent receiver overloading.

One secondary lead of the transformer T1 is connected to the base of an RF amplifier transistor Q1 which amplifies the received signal. The other secondary lead of transformer T1 connects to pin 8 of connector 503 which connects to the AGC (automatic gain control) circuit, described later.

The amplified RF signal appears at the collector of transistor Q1 and is coupled to a tuned circuit which comprises the primary of transformer T2 and the capacitor C2 which is tuned to the desired incoming frequency. The primary of transformer T2 is tapped to provide an impedance match to the collector of the transistor Q1.

From the secondary of the transformer T2, the amplified RF signal is coupled to the emitter of transistor Q2 in an autodyne converter. The autodyne converter circuit includes a crystal Y1 in a regenerative feedback circuit having a frequency to produce a 453 kHz difference signal on the wire 513 which is connected to pin 3 of the connector 502'. As such, if Y1 is a 26.542 MHz crystal, the autodyne circuit will shift a signal received at 26.995 MHz to a signal at 453 kHz.

Figure 13:
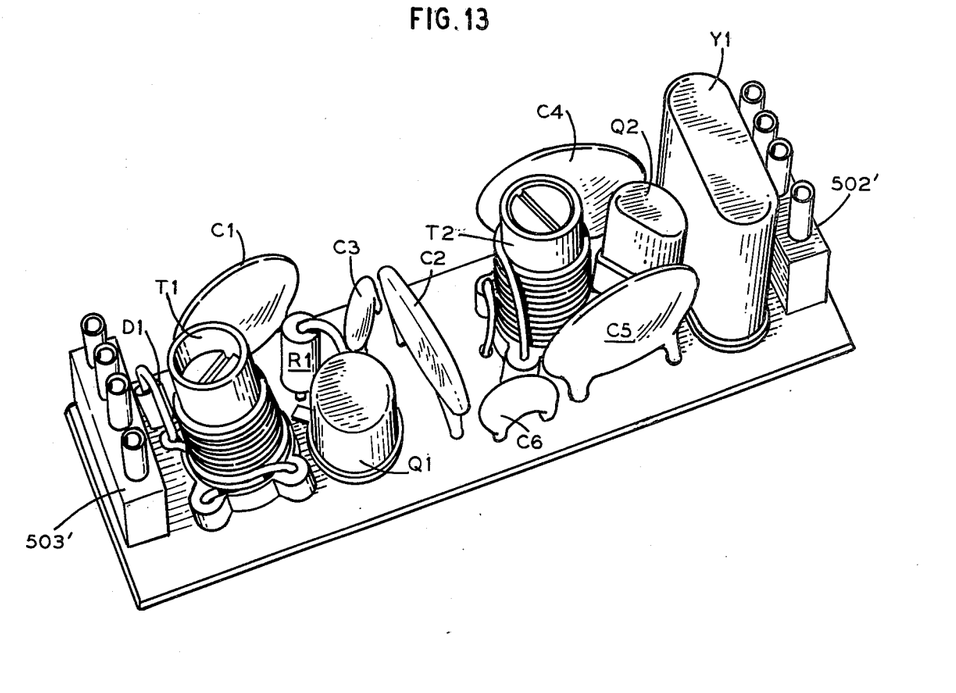
FIG. 13 shows the component layout of a typical receiver module of the invention.

The component layout for each pluggable rf module 500 is somewhat critical though nowhere as critical as the layout for the transmitter modules described earlier. One component layout for a pluggable rf module of the invention is shown in FIG. 13. This particular layout provides receiver stability, sensitivity and selectivity although other components layouts will provide acceptable results as well.

Returning to FIG. 11, the difference signal (an intermediate frequency signal) from the rf module connects via socket 3 of connector 502 to and through the coil L1 and the resistor R3 to the first of 3 series connected ceramic filters CF1, CF2 and CF3. These ceramic filters CF1, CF2, and CF3 in the circuit have a passband centered at 453 kHz, the frequency of the intermediate signal, and are operative to filter out signals not at that frequency.

Transistors Q3 and Q4 comprise two intermediate frequency amplifier stages whose output is coupled through a capacitor C14 to the base of a power detector circuit including transistor Q5. The transistor Q5 is normally off and a coil L3 and a diode D2 are operative so that it condusts on positive peaks of the IF signal passing through the capacitor C14.

The power detector output at point 515 is bypassed via the capacitor C15 to ground to remove signals at the intermediate frequency to keep the output at 515 low whenever a rf signal is present. In addition, the diode D3 and resistors R21 and R23 eliminate noise pulses under strong signal conditions while an integrator network comprising resistor R22 and capacitor C16 prevent noise interference under weak signal conditions. This circuitry produces a positive pulse train at the base of transistor Q6 that is equivalent to the inverse of the pulse train generated in the transmitter at the output of the monostable multivibrator MM shown in FIG. 14 ie. a positive pulse occurs at 515 whenever the rf signal is not present.

The receiver includes an automatic gain control (AGC) that comprises resistors R17, R13, R8 and R7 and capacitors C12 and C7 to couple part of the collector voltage from Q5 to the base circuits of the transistors Q1 and Q3. The stronger the received signal at the antenna 511 the more transistor Q5 conducts thereby lowering the voltage at its collector. This lower voltage is supplied through the resistors R17, R13, R8 and R7 to reduce the gain of transistors Q1, Q3 and Q4. This automatic gain control action prevents the IF amplifier and the detector circuit from overloading and producing improper pulses when strong signals are received.

The pulse train at the base of transistor Q6 is amplified thereby and further amplified by a second pulse amplifier transistor Q7. These pulse amplifier transistors Q6 and Q7 are normally cut-off until the pulse train at 515 has sufficient amplitude to turn them on thereby providing noise immunity for the receiver as well as producing clear, sharp pulses at point 516.

The pulse train at point 516 is connected to the input pin of a shift register integrated circuit IC1 which operates as follows. Assuming that the shift register is at rest, as soon as the first pulse of a frame appears at point 516, the shift register advances by one step and begins applying a voltage at the first output 517. When the next pulse occurs at 516, the shift register shifts by one position terminating the output voltage at 517 and applying an output voltage at the second output terminal 518.

IC1 responds to successive pulses at 516 to step sequentially through its 8 outputs and applies a voltage to each output terminal for a period of time corresponding to the time between the leading edge of pulses at 516. For the period of time between the pulse occurring at the end of the 8th channel position and the sync pulse occuring at the beginning of the frame, none of the 8 outputs are activated.

The voltage plses at each output terminal of IC1 is operative to control a connected servomechanism (not shown) which preferably takes the form of a Heath Model GDA-1205-5 Subminiature Digital Proportional servo or other similar servo-mechanism whose shaft position is adjusted according to the width of the pulse applied thereto.

Pin 2 of IC1 is a reset terminal which is connected to an RC network whose time constant is set to detect when the last pulse before the synchronizing pulse occurs. As each pulse appears at the point 516, IC1, via pin 2, charges the capacitor C22. This capacitor C22 is slowly discharged by a shunting resistor R31. Should the length of time between pulses at point 516 be approximately 4 milliseconds or greater, the voltage across the capacitor C22 will be low enough to reset IC1 thereby removing voltage from all output pins 9-16 and preparing it to decode a new frame when the next pulse appears at 516. This reset will occur during the period of time identified in FIG. 14 as the sync pause.

A regulator circuit of known design including transistor Q8, resistor R29 and capacitor C21 is provided between the integrated circuit IC1 and the remainder of the receiver module circuitry to maintain a constant voltage at point 521. Voltage variations occur at the point 520 as the servos connected to the output of IC1 are turned on and off. The regulator circuit, however, prevents these voltage variations from being transmitted to point 521 thus preventing these servo caused voltage variations from affecting the rest of the receiver module.

The circuit of FIG. 11 for the illustrated embodiment of the invention is constructed using the circuit elements in Table 4. Those of skill in the art will recognize that other components and configurations can be substituted for the chosen components to optimize the circuit for similar or other applications of the invention.

TABLE 4

| Receiver Components of FIG. 11 | | | |
|---|---|---|---|
| R2, R13 | 2700 | C7, C19 | .001uF |
| R3 | 100 | C8, C9, C11, C13, C15 C18, C22, | .047uF |
| R4 | 5600 | C12, C17 | 1uF |
| R5 | 820 | C14 | 180pF |
| R6, R9 | 6800 | C16 | .005uF |
| R7 | 33K | C21 | 33uF |
| R8, R21 | 18K | C23 | 2.2uF |
| R12, R19, R29 | 1000 | | |
| R14, R15, R16 | 2200 | L1 | 2.2uH |
| R18 | 15K | L2 | 1MH |
| R22, R28 | 10K | D2, D3 | IN4148 |
| R25 | 68K | | |
| R26, R27 | 47K | IC1 | SCUS0127 |
| R31 | 510K | | |
| R32 | 10 | CF1, CF2, CF3 | Sonus |

TABLE 4-continued

Receiver Components of FIG. 11

| | | EFC-D455K4 |
|---|---|---|
| Q3 | T1387 | |
| Q4, Q7 | X29A829 | |
| Q5 | 2N5232A | |
| Q6, Q8 | MPSA20 | |

While the foregoing discussion has been made with particular emphasis on an exemplary embodiment of the invention, it will be readily recognized by those of skill in the art that numerous modifications can be made to both the transmitter and the receiver without departing from the spirit and scope of the invention as defined in the following claims. For example, the transmitter modulator can take the form of a pulse code, pulse amplitude or other type of pulse modulator. Indeed, almost any type of modulator can be used provided that the information content of the radio signal can be easily removed at the receiver.

Other modifications are possible. For example, the transmitter and/or the receiver circuitry may take numerous other known circuit configurations. Also, the pluggable transmitter and/or receiver modules may be modified to include the antenna rather than using the module connector to provide the connection between the circuit and the antenna.

While the invention is particularly suitable for small portable radio control systems, the principal of the invention may also be suitable for other applications. However, these and other modifications to the illustrated embodiment can be made without departing from the spirit and scope of the invention as defined by the claims.

We claim:

1. A radio control system for remote control of a mechanism comprising, in combination:
   a radio transmitter including means mounted on a pluggable transmitter module to generate a radio signal at a first frequency and a modulation circuit to produce a modulation signal, said generating means and said modulation circuit being interconnected by a first disengageable plug and receptacle connection means to couple said modulation signal to said generating means which responds thereto by producing a modulated radio signal; and
   a radio receiver including means mounted on a pluggable receiver module to receive and convert said modulated radio signal into a modulated signal at a second frequency, a demodulator responsive to signals at said second frequency to remove the modulation therefrom to control said mechanism, and a second disengageable plug and receptable connection means to interconnect said means to receive and convert with said demodulator, said transmitter and receiver modules cooperating to enable operation of said system at said first frequency when they are jointly plugged into said transmitter and receiver, respectively.

2. The radio control system of claim 1 additionally including a transmitter antenna mounted on a chassis and coupled via said first connection means to said means to generate a radio signal.

3. The radio control system of claim 1 additionally including a receiving antenna coupled via said second connection means to said means to receive and convert.

4. The radio control system of claim 1 wherein said means to generate a radio signal includes a module having a single frequency oscillator with an output and means to amplify said oscillator output to produce a radio signal at said first frequency.

5. The radio control system of claim 1 wherein said means to receive and convert includes an amplifier to produce an amplified signal and an autodyne circuit responsive to said amplified first to convert the amplified signal at said single frequency to a signal at said second frequency.

6. The radio control system of claim 4 wherein said module has a metal case to minimize the effect of near by metal objects on operation of said oscillator and said amplifier.

7. A radio system for remote control of a mechanism comprising, in combination:
   a radio transmitter for producing a radiated modulated signal at a first frequency, the transmitter including a modulation circuit for producing a modulation signal containing information for control of the remotely controlled mechanism and a transmitting antenna;
   a first readily replaceable transmitter module coupled to said radio transmitter for generating a signal at said first frequency, said signal being radiated by said antenna;
   a first electrical connector portion connected to said transmitter module and a second connector portion connected to said radio transmitter, each of said first and second connector portions being cooperatively arranged to mate with the other for coupling said modulation signal to said transmitter module, said transmitter module responding to said modulation signal by modulating said signal at said first frequency; and
   a radio receiver for receiving said radiated modulated signal at said first frequency and removing the modulation therefrom, the removed modulation providing control for the mechanism, the receiver including a demodulator and a receiver antenna;
   a first readily replaceable receiver module coupled to said radio receiver and to said receiver antenna for converting signals received from said receiver antenna at said first frequency into a signal at a second frequency;
   said demodulator being responsive to a signal at said second frequency to remove the modulation therefrom;
   a third connector portion connected to said receiver module and a fourth connector portion connected to said radio receiver, each of said third and fourth connector portions being cooperatively arranged to mate with the other for coupling said signal at said second frequency from said receiver module to said demodulator said transmitter and receiver modules cooperating to enable operation of said system at said first frequency when they are jointly coupled to said transmitter and receiver, respectively.

8. The radio control system of claim 7 additionally including:
   for substitution for said first transmitter module, a second readily replaceable transmitter module having another first electrical connector portion connected thereto for producing a signal at a third frequency when said second transmitter module is coupled to said transmitting antenna and to said modulation signal via said other first electrical connector portion and said second connector portion; and for substitution for said first receiver module, a second readily replaceable receiver module having another third electrical connector portion connected thereto for receiving a signal at said third frequency and converting it to a signal at said second frequency when said second receiver module is coupled to said receiver antenna and also coupled to said demodulator via said other third electrical connector portion and said fourth connector portion.

9. The radio control system of claim 7 wherein said transmitter module includes an oscillator to produce a signal at said first frequency, and an amplifier to amplify the oscillator signal at said first frequency, said oscillator being turned on and off by said modulation signal.

10. The radio control system of claim 7 wherein said receiver module includes an amplifier to amplify received signals at said first frequency and an autodyne circuit responsive to the amplified received signals to produce said signal at said second frequency.

11. A radio control system for remote control of a device comprising, in combination:
　a plurality of transmitter modules, each transmitter module including means to produce a radio signal at a transmitter frequency, each module having a different characteristic transmitting frequency;
　a modulation circuit for generating a modulation signal containing control information for the device to be controlled;
　a transmitting antenna;
　disengageable coupling means to couple one said transmitter module to said modulation circuit and to said transmitting antenna, the coupled transmitter module responding to said modulation signal to produce a modulated radio signal which is radiated by said transmitting antenna and contains the control information of said modulation signal;
　a plurality of receiver modules, each receiver module including means to amplify and convert a received signal at one transmitter frequency to an intermediate frequency signal, the one transmitter frequency for each receiver module being different from the one transmitter frequency for each other receiver module;
　a receiver antenna;
　a demodulator responsive to signals at said intermediate frequency to remove control information therefrom and including means to connect the control information to said device; and
　an additional disengageable coupling means to couple one said receiver module to said receiver antenna and to said demodulator, the coupled receiver module being operative to convert a received signal at the same frequency as the coupled transmitter module to said intermediate frequency.

12. The radio control system of claim 11 wherein said modulation circuit causes the coupled transmitter module to turn said radio signal on and off, the time between successive off periods for said radio signal containing the control information for said device.

13. A radio control system for remotely controlling a plurality of servomechanisms comprising, in combination:
　a plurality of adjustable controls each for adjusting the electrical parameter of a circuit component to a value representative of the desired position of a specific one of a plurality of servomechanisms;
　a modulator means responsive to all said adjusted circuit components to produce a train of pulses, each time period between adjacent pulses being representative of the value of one adjusted circuit component;
　an antenna;
　a hand-held transmitter chassis with said controls, said antenna and said modulator means being mounted thereon;
　power supply means within said chassis coupled to said controls and said modulation means to provide electrical power therefor;
　a radio transmitter module removably coupled to said modulation means, said antenna and said power supply means by an easily engaged or disengaged coupling means, said transmitter producing a radio signal at a fixed radio control frequency in response to said pulses generated by said modulation means, said radio frequency signal being coupled to and radiated by said antenna;
　a receiver antenna;
　a receiver module including a radio frequency amplifier responsive to radio frequency signals at said fixed radio control frequency to produce an amplified radio frequency signal, said receiver module including a frequency converting circuit for converting said amplified radio frequency signal to an intermediate frequency signal;
　a plurality of servomechanisms;
　a receiver circuit responsive only to signals at said intermediate frequency, said receiver circuit including an intermediate frequency amplifier to amplify a signal at said intermediate frequency and demodulation means for removing modulation from said amplified signal, said receiver circuit including a distribution means to direct a portion of the removed modulation signal related to a given circuit component to its corresponding servomechanism;
　a second easily engaged or disengaged coupling means for coupling said receiver module to said receiver circuit and said antenna, said antenna being coupled thereby to said radio frequency amplifier, said intermediate frequency signal from said receiver module being coupled thereby to said intermediate frequency amplifier;
　a second receiver module and a second transmitter module, said second receiver module responsive to radio frequency signals at a second fixed radio control frequency different from said first mentioned fixed radio control frequency and said second transmitter module for producing a radio frequency signal at said second fixed radio control frequency, said second receiver module and said second transmitter module comprising means to change the operating frequency of the radio control system when they replace respectively said first mentioned receiver module and transmitter module.

14. The radio control system of claim 13 wherein each transmitter module is surrounded by an electrically conductive case.

15. The radio control system of claim 13 wherein each transmitter module has a plurality of tunable coils, said coils being arranged with their magnetic axes parallel to each other and positioned as far from each other as possible.

16. A radio control system for a controlled device comprising, in combination:
- a modulation circuit for producing a modulation signal;
- a plurality of transmitter modules each employing an operating frequency different from the operating frequency of the other transmitter modules and each including means responsive to a modulation signal to produce a modulated radio frequency signal for transmission at a given operating frequency;
- means coupled to said modulation circuit for receiving one of said plurality of transmitter modules to couple said modulation signal to said received transmitter module;
- a receiver circuit responsive to a modulated signal at a given intermediate frequency for removing said modulation signal to control said device;
- a plurality of receiver modules each employing the operating frequency of a corresponding one of said transmitter modules and each responsive to a received modulated radio frequency signal at a given operating frequency of a transmitter module for producing a modulated signal at said given intermediate frequency; and
- means coupled to said receiver circuit for receiving one of a plurality of said receiver modules and coupling said modulated signal at said given intermediate frequency from said received receiver module to said receiver circuit, said received receiver module being responsive to a modulated radio frequency signal at the same given operating frequency as produced by said received transmitter module.

17. The radio control system of claim 16 wherein each of said transmitter modules has a metal case to eliminate effects on the transmitter module from adjacent metal objects.

18. The radio control system of claim 16 additionally including a transmitting antenna coupled by said means coupled to said modulation circuit to said received transmitter module.

19. The radio control system of claim 16 additionally including a receiving antenna coupled by said means coupled to said receiver circuit to said received receiver module.

* * * * *